(12) United States Patent
Agrawal et al.

(10) Patent No.: US 9,749,403 B2
(45) Date of Patent: Aug. 29, 2017

(54) MANAGING CONTENT DISTRIBUTION IN A WIRELESS COMMUNICATIONS ENVIRONMENT

(75) Inventors: Dakshi Agrawal, Monsey, NY (US); Sihyung Lee, Seoul (KR); Vasileios Pappas, Elmsford, NY (US); Mudhakar Srivatsa, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 638 days.

(21) Appl. No.: 13/370,935

(22) Filed: Feb. 10, 2012

(65) Prior Publication Data

US 2013/0208888 A1     Aug. 15, 2013

(51) Int. Cl.
*H04L 29/06* (2006.01)
*H04L 29/08* (2006.01)
(Continued)

(52) U.S. Cl.
CPC .......... *H04L 67/1021* (2013.01); *H04L 67/18* (2013.01); *H04L 67/2857* (2013.01);
(Continued)

(58) Field of Classification Search
CPC ............. H04L 67/1002; H04L 67/2842; H04L 67/289; H04L 67/2852; H04L 2029/06054;
(Continued)

(56) References Cited

U.S. PATENT DOCUMENTS 6,385,693 B1   5/2002  Gerszberg et al.
7,499,981 B2   3/2009  Harrow et al.
(Continued)

FOREIGN PATENT DOCUMENTS

CN          101951395 A  *  1/2011
WO     WO 2007/071007 A1    6/2007

OTHER PUBLICATIONS

Sowmia Devi M.K. and Prathima Agrawal, Dynamic Interface Selection in Portable Multi-Interface Terminals, 2007, Auburn University, IEEE.*

(Continued)

*Primary Examiner* — Carl Colin
*Assistant Examiner* — Gary Lavelle
(74) *Attorney, Agent, or Firm* — Scully, Scott, Murphy & Presser, P.C.; Jennifer R. Davis, Esq.

(57) ABSTRACT

A method, system and computer program product for managing content distribution in a mobile communications environment. The communications environment includes a core network and a multitude of end-user devices. In one embodiment, the method comprises downloading content from the core network to the end-user devices; and maintaining a map between the end-user devices, the content downloaded to the end-user devices, and the locations of the end-user devices. When a first of the end-user devices requests a specified content, this map and one or more rules are used to identify a second of the end-user devices having the specified content. The first of the end-user devices fetches the specified content from this identified second of the end-user devices. In one embodiment, object location descriptors embedded in the content are rewritten when the content is downloaded to the end-user devices.

24 Claims, 4 Drawing Sheets

(51) Int. Cl.
*H04W 4/02* (2009.01)
*G06F 17/30* (2006.01)
*G06F 12/0806* (2016.01)
*H04B 7/185* (2006.01)

(52) U.S. Cl.
CPC ........... *H04W 4/02* (2013.01); *G06F 12/0806* (2013.01); *G06F 17/30209* (2013.01); *G06F 17/30902* (2013.01); *H04B 7/18584* (2013.01); *H04L 67/1002* (2013.01); *H04L 67/104* (2013.01); *H04L 67/1014* (2013.01); *H04L 67/1095* (2013.01); *H04L 67/288* (2013.01); *H04L 67/289* (2013.01); *H04L 67/2842* (2013.01); *H04L 2029/06054* (2013.01)

(58) Field of Classification Search
CPC ............... H04L 67/104; H04L 67/1095; H04L 67/1014; H04L 67/1021; H04L 67/288; G06F 17/30902; G06F 12/0806; G06F 17/30209; H04B 7/18584
USPC ........................................................ 380/255
See application file for complete search history.

(56) References Cited

U.S. PATENT DOCUMENTS

| | | | |
|---|---|---|---|
| 7,617,220 | B2 | 11/2009 | Crowley et al. |
| 7,769,002 | B2 | 8/2010 | Gong et al. |
| 2003/0074403 | A1* | 4/2003 | Harrow et al. ............... 709/203 |
| 2003/0187973 | A1* | 10/2003 | Wesley ........................ 709/224 |
| 2006/0235975 | A1* | 10/2006 | Delhumeau et al. ......... 709/226 |
| 2008/0059631 | A1* | 3/2008 | Bergstrom et al. ........... 709/224 |
| 2009/0017789 | A1* | 1/2009 | Thomas et al. ............... 455/406 |
| 2010/0161831 | A1* | 6/2010 | Haas .................... G06F 15/173 709/235 |
| 2010/0191756 | A1* | 7/2010 | Terao et al. .................. 707/758 |
| 2010/0332588 | A1* | 12/2010 | Schwimer ............ H04L 67/306 709/203 |
| 2011/0292884 | A1* | 12/2011 | Li et al. ........................ 370/329 |
| 2012/0089700 | A1* | 4/2012 | Safruti et al. ................. 709/217 |
| 2012/0166483 | A1* | 6/2012 | Choudhary et al. .......... 707/770 |
| 2013/0031170 | A1* | 1/2013 | Pacella et al. ................ 709/204 |
| 2013/0275563 | A1* | 10/2013 | Luna et al. ................... 709/219 |

OTHER PUBLICATIONS

Xing et al., "Proximiter: Enabling Mobile Proximity-Based Content Sharing on Portable Devices", IEEE International Conference on Pervasive Computing and Communications, 978-1-4244-3304-9/09, 2009 IEEE, pp. 1-3.

Krejcar et al., "Dataflow Optimization Using of WiFi, GSM, UMTS, BT and GPS Positioning in Mobile Information Systems on Mobile Devices", 2010 Second International Conference on Co, 978-0-7695-3982-9/10, 2010 IEEE, pp. 127-131.

Tan et al., "SCAP: smart caching in wireless access points to improve P2P streaming", 27th International Conference on Distributed Computing Systems, ICDCS '07, 0-7695-2837-3/07, 2007 IEEE.

Ghini et al., "Smart Download on the Go: A Wireless Internet Application for Music Distribution over Heterogeneous Networks", IEEE International Conference on Communications, 2004, Issue Date: Jun. 20-24, 2004, vol. 1, 0-7803-8533-01/04 2004 IEEE, pp. 73-79.

Ylitalo et al., "Dynamic Network Interface Selection in Multihomed Mobile Hosts", Proceedings of the 36th Annual Hawaii International Conference on System Sciences, 0-7695-1874-5/03, 2002 IEEE.

Devi et al., "Dynamic Interface Selection in Portable Multi-interface Terminals", IEEE International Conference on Portable Information Devices, PORTABLE07, 1-4244-1039-8/07, 2007 IEEE, pp. 1-5.

* cited by examiner

MANAGING CONTENT DISTRIBUTION IN A WIRELESS COMMUNICATIONS ENVIRONMENT

STATEMENT OF GOVERNMENT INTEREST

This invention was made with Government support under Contract No.: W911NF-09-2-0053 awarded by the Army Research Office (ARO). The Government has certain rights in this invention.

BACKGROUND OF THE INVENTION

This invention generally relates to wireless communications, and more specifically to managing content distribution in a wireless communications environment.

Wireless communications networks increasing are implementing the distribution of bandwidth intensive content to and from wireless devices. Bandwidth constraints are fundamental bottlenecks in a wireless network. Depending on the deployment, such bottlenecks may occur in the radio-access network, in the back-haul network, or somewhere else in the wireless infrastructure. One solution to avoid bandwidth bottlenecks is to store content as close to the user end-device as possible so that the fetched content that needs to be transmitted on demand over the wireless link can be minimized. For example, if a browser in the user end device caches content locally on the user end-device, then the browser need not fetch that content on demand over the wireless channel, the browser could just retrieve the local copy.

BRIEF SUMMARY

Embodiments of the invention provide a method, system and computer program product for managing content distribution in a mobile communications environment. The communications environment includes a core network and a multitude of end-user devices. In one embodiment, the method comprises downloading content from the core network to the end-user devices; and a map is maintained between the end-user devices, the content downloaded to the end-user devices, and the locations of the end-user devices. When a first of the end-user devices requests a specified content, this map and one or more rules are used to identify a second of the end-user devices having the specified content for downloading the specified content to said first of the end-user devices. Said first of the end-user devices fetches the specified content from the identified second of the end-user devices.

In one embodiment, object location descriptors embedded in the content are rewritten when the content is downloaded to the end-user devices.

In an embodiment, the downloading of the content from the core network to the end-user devices is monitored, and this monitoring is used to identify patterns of requests for the content by selected ones of the end-user devices.

In one embodiment, for example, a pattern by the first of the end-user devices is identified. Based on this pattern by the first of the end-user devices, a particular item of content is downloaded to the second of the end-user devices, before the first of the end-user devices actually requests this particular content item, for subsequent fetching by the first of the end-user devices.

In an embodiment, the specified content may be encrypted on the second of the end-user devices, and a key for decrypting this encrypted specified content is sent to the first of the end-user devices.

In one embodiment, a plurality of communication modes are used to communicate between the end-user devices, and one of the communication modalities is selected as a preferred modality. The second of the end-user devices is identified by identifying the end-user device that is the closest to said first of the end-user devices of the end-user devices that communicates with the first of the end-user devices through said preferred mode.

In an embodiment, a plurality of communication modes are used to communicate between the end-user devices, and one of the communication modes is identified as a least used mode. One of the rules used to identify said second of the end-user devices is that the second of the end-user devices communicates with the first of the end-user devices using said least used modality.

In one embodiment, an anticipated demand for the content is identified, and the content is downloaded to one or more defined locations based on this identified anticipated demand.

In an embodiment, the content is downloaded to a multitude of defined locations dispersed throughout the core network.

In one embodiment, the identified anticipated demand is by a community of the end-user devices. One or more defined community service locations are identified for serving this community of the end-user devices, and the content is downloaded to this one or more defined community service locations.

Embodiments of the invention utilize a massively distributed storage system that comprises physical storage on user end-devices. The physical space is controlled by storage servers that are located in the wireless infrastructure provider's facilities, for example, in base stations, RNCs, or the core network. Each storage server controls a subset of the user end-devices and satisfies their content fetching needs. Proxy devices in the wireless infrastructure, working in conjunction with the storage servers, rewrite object location descriptors embedded in the content so that a user end-device is able to fetch data from a physical location over a communication channel that is, for example, most economical. Furthermore, with the help of data mining and pattern discovery on user data, the storage server may, in embodiments of the invention, pro-actively push content to the user end-devices.

The use of this distributed storage system controlled by servers in the wireless infrastructure is advantageous compared to the existing solution of browser caching as (a) cached content can be shared among applications with far less security concerns, (b) content can be pushed proactively to the user end-device, (c) current network congestion can be taken into account as physical location is specified by the servers, which are controlled by the wireless service provider, and (d) a user end-device can make more informed decisions about using a particular communication modality (i.e., which wireless interface(s) to use) based on the available locations of the content.

DETAILED DESCRIPTION

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
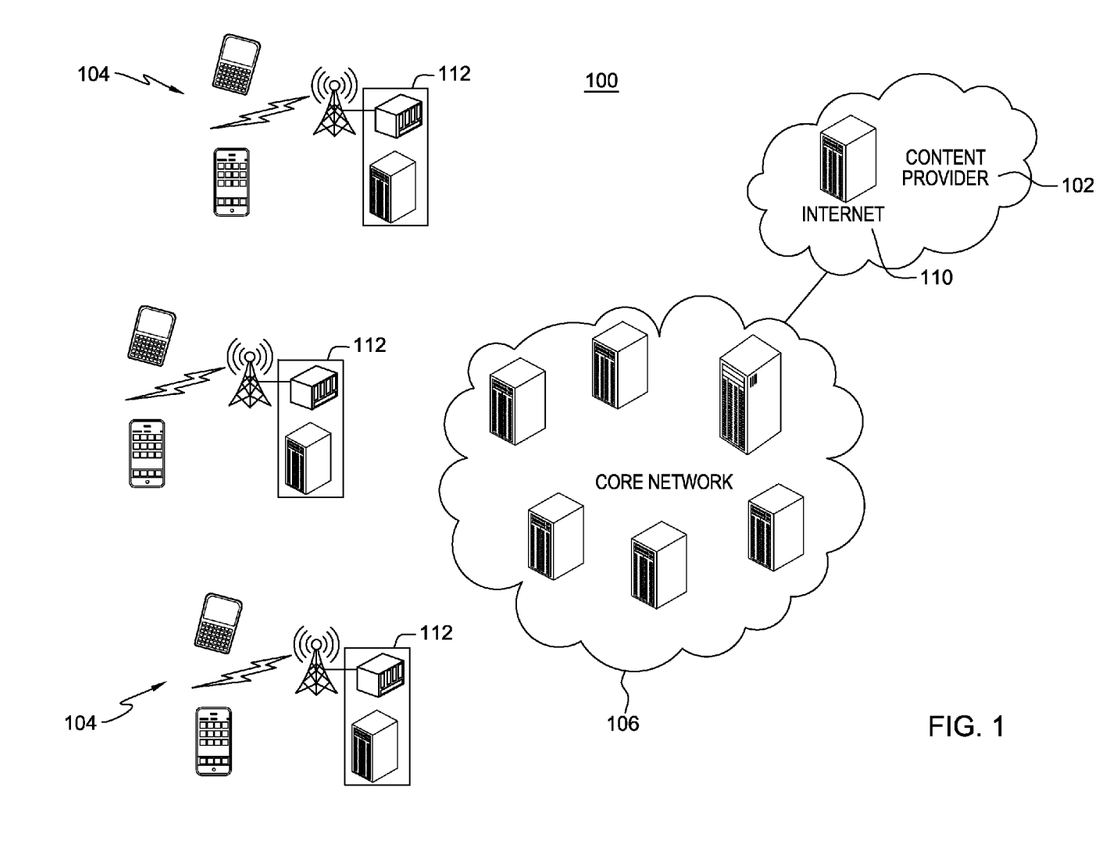
FIG. 1 illustrates a mobile communications network employing content placement and dissemination strategies in accordance with an embodiment of the invention.

The present invention provides a method, system and computer program product for managing content distribution in a wireless communications environment. FIG. 1 illustrates a communications environment 100 in which embodiments of the invention may be implemented. In this environment, content from a content provider 102 is delivered to user end-devices 104 via a core network 106. In the example environment depicted in FIG. 1, the content provider sends the content to the core network over a distributed network 110 such as the Internet, and the core network, in turn, transmits the content to the user end-devices through a series of base stations 112.

Core network 106 is a collection of cells that each includes at least one base station 112 capable of transmitting and relaying signals to subscriber's mobile devices. A "cell" generally denotes a distinct area of a cellular network that utilizes a particular frequency or range of frequencies for transmission of data. A typical base station is a tower to which are affixed a number of antennas that transmit and receive the data over the particular frequency or range of frequencies. Mobile devices 104, such as cellular or mobile phones, smart phones, camera phones, personal digital assistants (PDA's), tablets and laptop computers, may initiate or otherwise transmit a signal at the designated frequency to the base station in order to initiate a call or data session and begin transmitting data. It may be noted that a wide range of combinations of frequency, time and codes are possible and may be used on the practice of this invention, and the use of dedicated single-frequency carriers is not a requirement.

Cellular service providers convert cellular signals, e.g., Time Division Multiple Access (TDMA) signals, Orthogonal Frequency-Division Multiplexing (OFDM) signals or Code Division Multiple Access (CDMA) signals, received at a base station from mobile devices into Internet protocol (IP) packets for transmission within the packet-based networks. A number of standards have been proposed to facilitate this conversion and transmission of cellular signals to IP packets, such as a General Packet Radio Service (GPRS) standardized by the Global System for Mobile Communications (GSM) Association, WiMax and LTE, as well as other standards.

Regardless of which standard a cellular service provider chooses to adopt, each of the standards generally defines a cellular network architecture in which a particular mobile device is associated with a specific gateway device and an anchor device. Upon initiating a packet-based data communication session, the mobile device is bound to both a gateway device and an anchor device within the cellular network architecture. Commonly, each gateway device is an IP gateway or other IP-enabled access router that is associated with one or more base stations proximate to the origin of the communication session. In this way, the gateway devices make up the IP edge for the mobile subscribers. Through the transmission and relay capabilities of the base stations, each gateway device handles data session initiated by the mobile device and routes the IP communications to the packet-based networks. That is, the gateway device routes any data communication originated by the mobile device to the anchor device.

The anchor device is typically a service-oriented IP-enabled router that stores policies and other information (collectively, a "subscriber context") that are specific to a particular mobile device. The subscriber context may define, for example, a level or quality of service, encryption keys, address information, multicast group memberships, and charging and accounting information to account for the services provided to the particular mobile device. The anchor device provides an "anchor" or a set location for subscriber-specific context information (referred to as "subscriber contexts") required to access the packet-based network continuously while the associated mobile devices move through the cellular network. The anchor device may mark, tag, or otherwise process the data communication in accordance with the subscriber context and then route the data communication to the intended destination within the packet-based network. In some cellular architectures, the gateway device may be referred to as a "foreign agent" while the "anchor device" may be referred to as a "home agent."

The mobile devices 104 are representative of any appropriate type of device that include a portable computing device, such as a laptop, a personal digital assistant ("PDA"), a portable phone, such as a cell phone or the like, a smart phone, a Session Initiation Protocol (SIP) phone, a video phone, a portable email device, a thin client, or a portable gaming device. Mobile devices 104 may also be, as additional examples, tablet computers and single-purpose mobile devices (such as eBooks).

The mobile devices 104 are in wireless communication with the network 106 through the base station 112 in accordance with protocols as known by those skilled in the art. Each base station 112 has an antenna whose radio coverage is typically tuned to a specific geographic area. As will be understood by those skilled in the art, it should be noted that there need not necessarily be a one-to-one correspondence between base stations and geographic areas, in that multiple base stations may cover one area and one base station may cover multiple areas.

As mentioned above, in FIG. 1, the content provider is represented at 102. Many specific types of content providers that provide a wide range of content may use or be used in embodiments of the invention. The content provided by these providers may include information about or related to, for example, news, entertainment, sports, finances, shopping, gaming, auctions, and many others. Further, although the example of FIG. 1 depicts the content provider 102 as implemented in an external network outside of the core network 102, in alternate embodiments, one or more content providers 102 may be implemented within the core network 106.

The present invention, as mentioned above, provides a method, system and computer program product for managing content distribution in a wireless communications environment. Embodiments of the invention locate and cache content in the user end-devices, and possibly in other places in the network, in order to provide more bandwidth savings than is possible with browser based caching.

Embodiments of the invention utilize a massively distributed storage system that comprises physical storage on user end-devices. The physical space is controlled by storage servers that are located in the wireless infrastructure provider's facilities, for example, in base stations, RNCs, or the core network. Each storage server controls a subset of the user end-devices and satisfies their content fetching needs. Proxy devices in the wireless infrastructure, working in conjunction with the storage servers, rewrite object location descriptors embedded in the content so that a user end-device is able to fetch data from a physical location over a communication channel that is, for example, most economical. Furthermore, with the help of data mining and pattern discovery on user data, the storage server may, in embodiments of the invention, pro-actively push content to the user end-devices.

Specifically, the content may be fetched from other user end-device in the network vicinity. An alternative communication channel may be initiated to another network element, and content fetched over this alternative communication channel (current wireless user end-devices typically have three to five wireless communication modalities and it is expected to grow to eight to ten in next five years).

In embodiments of the invention, the network 106 can assist a mobile device in acquiring the desired content and can make the content distribution more efficient.

A) Content Acquisition

In many cases, the same content (public and private) might be stored in multiple devices which might be accessible through various means. For example, a user might request a web video from his cell-phone and the same video might be available at the originating web-server, at a transparent caching server somewhere in the cellphone network provider, at the users PC, at the users DVR/Internet TV box, or at the cellphone of a another user sitting next to him. In addition, the user's cellphone can communicate with all these different machines through various means or modes: through the 3G interface, through the WiFi interface, through the Bluetooth interface, or others. For any given point of time and depending on the location of the user, one communication modality might be more appropriate to use compared to all the other communication mode or modalities (either in terms of download time, or in terms of energy used, or in terms of cost, for example).

Embodiments of the invention utilize a network element that has knowledge of all the communication modalities that one can make use of and, in addition, knows the location of the content (public or private) that the user is requesting. Then, depending on the network conditions and the user preferences, this network element rewrites the user's request so that the content is downloaded to the user from the appropriate locations and through the appropriate communication modality (or modalities if more than one communication channels can be used concurrently). This network entity can be placed at various locations: at the cloud (e.g., provided as a service somewhere in the Internet), at the cell-phone network provider, at the users device, or in a combination of the above locations. When provided as a cloud service, the element can take advantage of the available content from users across multiple cell-phone network providers. In contrast, when placed in a cell-phone network provider, the element can make use of data related to users of that cellphone network. When placed on the user device, the element can make use only of the data related to that user's devices.

Figure 2:
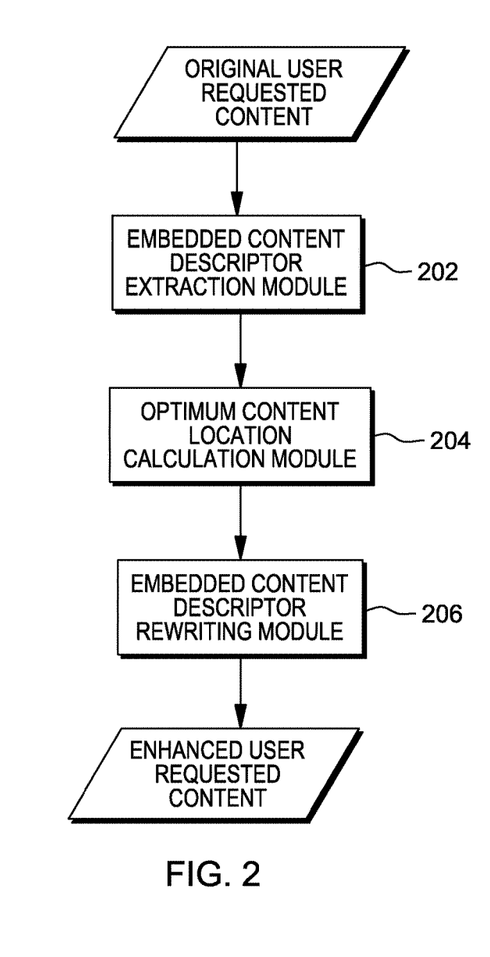
FIG. 2 shows modules used to rewrite a user request in accordance with an embodiment of the invention.
Figure 3:
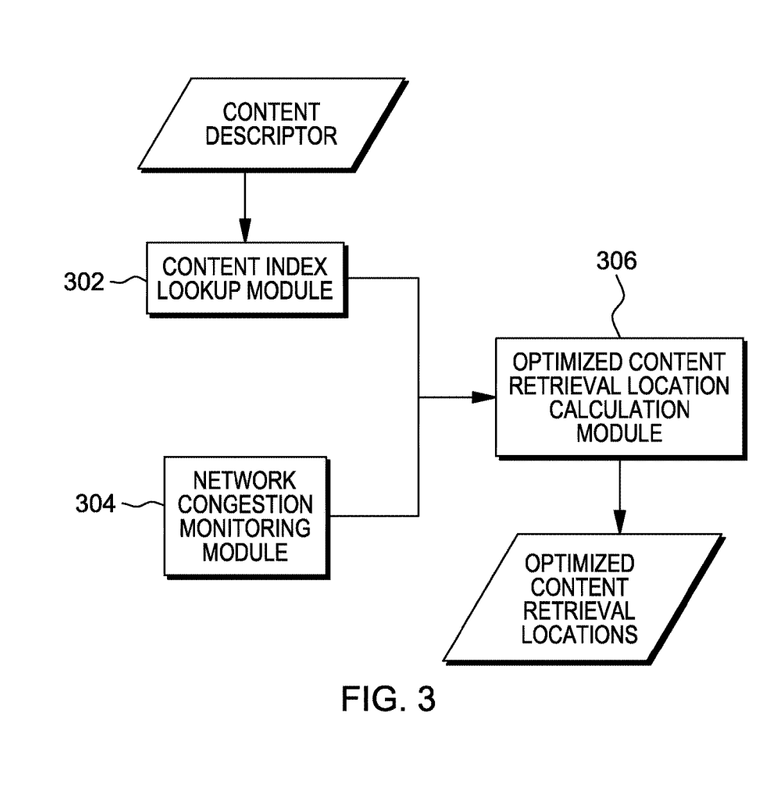
FIG. 3 depicts additional modules used to determine the location from which content is to be retrieved in an embodiment of the invention.

FIGS. 2 and 3 show modules that may be used to implement this content delivery strategy. Module 202 is used to extract an embedded content descriptor, module 204 is an optimum content location calculation module, and module 206 is an embedded content descriptor rewrite module. The content then become enhanced user requested content.

Module 302 of FIG. 3 is a content index look-up module, and module 304 is a network congestion module. Based on output from these two modules 302 and 304, module 306 is used to calculate an optimum content retrieval location.

Various algorithms can be used in order to select the best location and the best communication modality. One algorithm can be one that statically ranks the different communication modalities and then selects the location that is the closest given the best communication modality. For example, if a Bluetooth connection is always preferred over a 3G and a Wi-Fi connection, and a Wi-Fi connection is always preferred over a 3G network, then an Internet enabled car media system will access a youtube video from a cell-phone through the Bluetooth connection if the video file is already cached there, or through a public Wi-Fi network or a 3G network if the video is not in the cellphone. A more sophisticated algorithm can take into consideration the real-time utilization of the various communication modalities as well as the future prediction of their availability and utilization, and select the one that is currently (and in the future) the least utilized one.

In order to deal with private data, the content acquisition system can, in an embodiment, generate on the fly temporary symmetric keys that can be used in order to securely acquire and transmit the data, without the need of a public key infrastructure.

Figure 4:
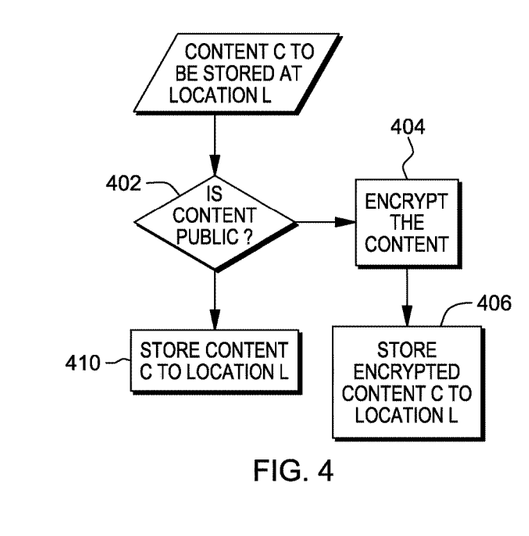
FIG. 4 is a flow chart illustrating a procedure in which content may be encrypted in an embodiment of the invention.
Figure 5:
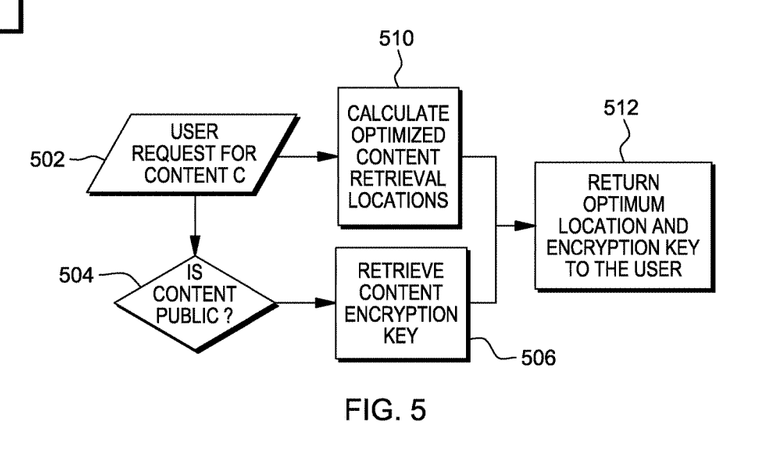
FIG. 5 shows a procedure for determining where to obtain requested content when that content may be encrypted.

FIGS. 4 and 5 illustrate procedures that may be used when the content may be encrypted. With reference to FIG. 4, step 402 is to determine whether that content is public or private. If the content is private, the content is encrypted, at step 404, and then, at step 406, stored at location L. If the content is public, that content can, as represented at 410, be stored at location L without being encrypted.

With reference to FIG. 5, at step 502, a user requests content, and step 504 is to determine whether the content is public or private; and if the content is private, an encryption key is retrieved at 506. Parallel with this, the optimized content retrieval location is calculated at 510. The calculated optimum location and the encryption key are returned to the user at 512.

B) Content Distribution

Currently, the most popular caching technique is browser caching at the wireless user end-device. When a web object is marked as cacheable, the browser, upon receiving the object, may cache the object if the browser's caching policies and resources would allow it to do so. On subsequent access of the same object, the browser will serve the cached object from its local cache instead of fetching the object over the wireless infrastructure. A similar technique is also used by mobile applications, where each application creates its own cache. Another technique is hierarchical caching, where an object is sought higher and higher up in the hierarchy of caches in the case of a cache miss.

Information items may be generally classified into: (i) globally hot—information of interest to wide audience across the geography covered by the entire network, (ii) locally (geographically) hot—information of interest to audience within a certain geography, and (iii) community hot—information of interest to certain set of users that may be a part of a social network/online community. Metadata on the information item may be used to classify the item into one of these three classes; additionally, in case of classes (ii) or (iii), the geographies (online communities) may be identified wherein the information item would be hot. Indeed, one could also learn target geographies or online communities based on initial accesses to these information items (if there is no metadata attached with the information items).

Embodiments of the invention leverage social networks and mobility models to enhance caching and content distribution strategies. The wireless/cellular network provider has the following "contact" information: (i) contact between a user and a modality of communication (e.g., home Wifi, Office LAN, 3G, etc), (ii) contact between users (e.g., from call detail records) which can be used to mine social networks/online communities, and (iii) contact between a user and an information item (or the metadata of the information item). Such contact times may be stochastically modeled as contact time distributions (e.g., user—network contact times; user—information item metadata contact times); user-user contacts may also be inferred by a network service provider based on the geographical proximity of two or more users (besides direct observations from call detail records).

Based on the classification of the information item, the network service provider may choose a caching/content distribution strategy. Globally hot information items may be massively replicated on the cellular network provider's infrastructure; locally hot information items may be cached at the local base stations; community hot items may be cached at selected base stations wherein the users in the target community have a high likelihood of contact. In all these cases, information may be pro-actively pushed to the caching nodes in the cellular network infrastructure or one may leverage lazy/on-path caching techniques wherein information is cached by the network the first time it is accessed by a user. Further, information items may be pro-actively pushed to end user devices when the user is in contact with the "better" network (say, faster, cheaper-driven by a configuration policy)—e.g., when the user is at home, the information may be pre-fetched using home WiFi rather than 3G. Updates to information items may be disseminated using delta-encoding.

Key Steps of embodiments of the invention include:
1) Mining multi-dimensional patterns including "time"+ "location" as well as "content"

2) Correlating these spatio-temporal patterns "over multiple users"; and
3) Correlating these spatio-temporal patterns "over multiple servers in different locations".

Steps (1), (2) and (3) help to determine (i) "when" and (ii) "where" to pre-fetch/push content, and (iii) "how long" to keep the content in storage.

The following examples illustrate embodiments of the invention.

Example (1)

Figure 6:
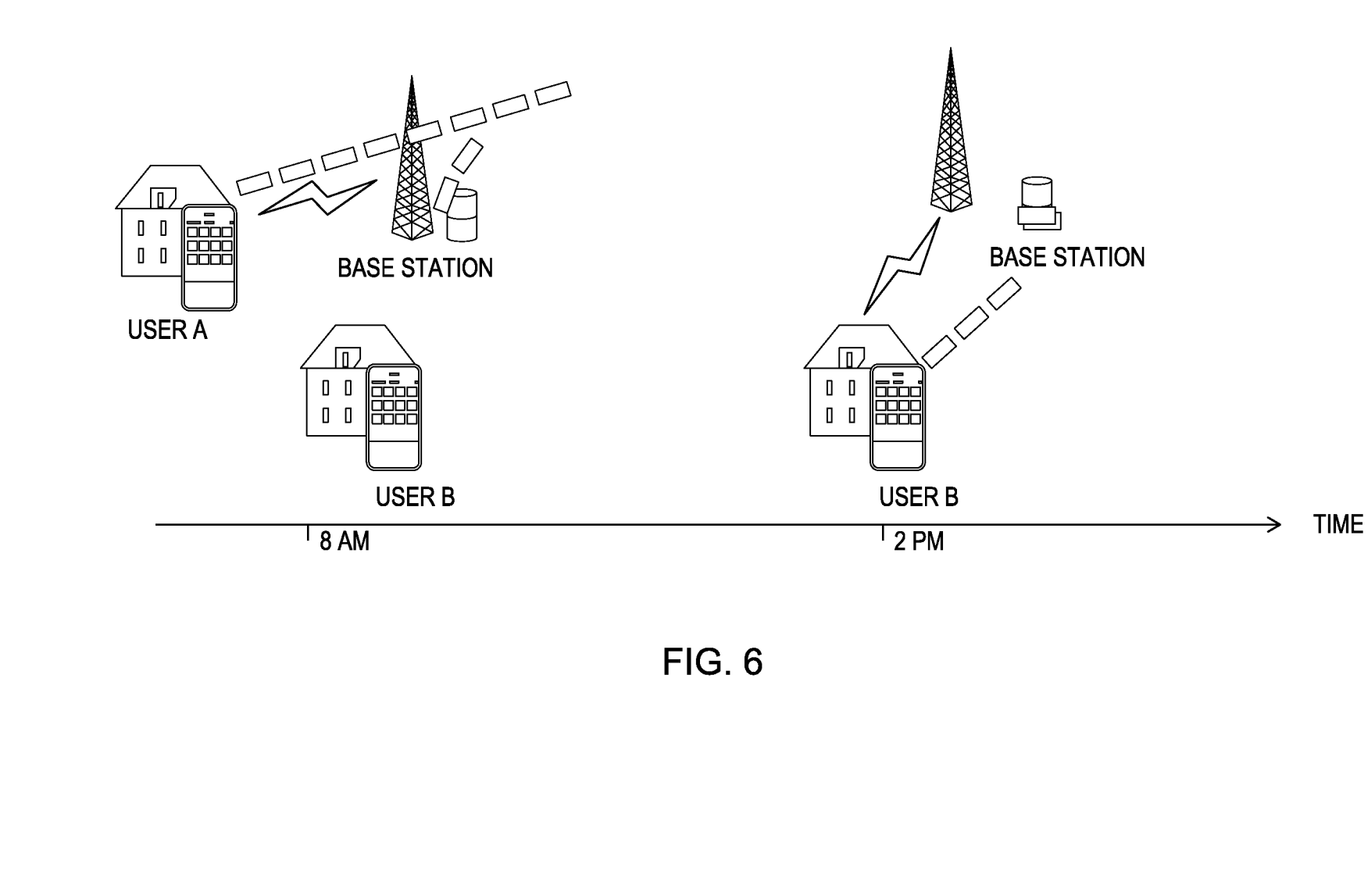
FIG. 6 illustrates an example of an embodiment of the invention.

With reference to FIG. 6, two spatio-temporal patterns are mined such that
(p1) User A typically accesses content C at home in the morning and then leaves home for work during the day.
(p2) User B typically works from home and accesses C during the day.
then we can determine (i), (ii), and (iii) as follows
(i) and (ii): as A consumes C, store C at BS/RNC (rather than at A's mobile device since A will move away).
(iii) Continue to store C until the end of the day (and then this content can be removed if resources are limited).

Example (2)

If user A accesses FB from everywhere (in many different locations),
Pre-fetch and push FB contents to A's mobile device.
Otherwise, if A watches "Program D" only from home,
Pre-fetch and store the contents at BS/RNC near A's home.

Example (3)

According to access patterns, if more users are likely to access content C, give higher priority to caching C than to caching other contents.

While it is apparent that the invention herein disclosed is well calculated to achieve the features discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of managing content distribution in a mobile communications environment comprising a core network and a multitude of end-user devices, the method comprising:
downloading content from the core network to the end-user devices:
maintaining a map between the end-user devices, the content downloaded to the end-user devices, and the locations of the end-user devices;
when a first of the end-user devices requests a specified content, using said map and one or more given rules to identify a second of the end-user devices having the specified content for downloading the specified content to said first of the end-user devices, including receiving the request at a network element having knowledge of the location of the content, and the network element rewriting the request so that the specified content is downloaded to the first of the end-user devices from the second of the end-user devices, the rewriting including extracting an embedded content descriptor from the request,
selecting a location of the specified content, including inputting the content descriptor to a content lookup module, and based on output from the content lookup module and a network congestion monitoring module, calculating a content retrieval location, and
rewriting the embedded content descriptor to enable the first of the end-user devices to fetch the specified content from the second of the end-user devices;
returning the re-written embedded content descriptor to the first of the end-user devices; and
said first of the end-user devices fetching the specified content from the identified second of the end-user devices; and wherein
the downloading content includes pre-pushing the specified content, before the specified content is requested, to one of a group of locations based on a classification of the specified content; and
the pre-pushing the specified content includes determining when and where to pre-push the specified content, and how long to keep the specified content in storage, by correlating spatio-temporal patterns over multiple users, and correlating the spatio-temporal patterns over multiple servers at different locations of the mobile communications environment.

2. The method according to claim 1, wherein the maintaining a map includes rewriting object location descriptors embedded in the content when the content is downloaded to the end-user devices.

3. The method according to claim 1, wherein the downloading content from the core network to the end-user devices includes:
monitoring the downloading of the content from the core network to the end-user devices; and
using said monitoring to identify patterns of requests for the content by selected ones of the end-user devices.

4. The method according to claim 3, wherein:
the content includes a multitude of content items;
the identified patterns include a pattern by the first of the end-user devices; and
the downloading includes downloading a particular one of the content items to the second of the end-user devices based on the pattern by the first of the end-user devices, before the first of the end-user devices requests said particular one of the content items, for subsequent fetching by the first of the end-user devices.

5. The method according to claim 1, further comprising:
encrypting the specified content on said second of the end-user devices; and
sending to said first of the end-user devices a key for decrypting the encrypted specified content.

6. The method according to claim 1, wherein:
a plurality of communication modes are used to communicate between the end-user devices;
one of the communication modes is selected as a preferred mode; and
the second of the end-user devices is identified by identifying the end-user device that is the closest of the end-user devices to said first of the end-user devices that communicates with the first of the end-user devices through said preferred mode.

7. The method according to claim 1, wherein:
a plurality of communication modes are used to communicate between the end-user devices;
one of the communication modes is identified as a least used mode; and
one of the rules used to identify said second of the end-user devices is that the second of the end-user devices communicates with the first of the end-user devices using said identified least used mode.

8. The method according to claim 1, wherein the downloading content from the core network to the end-user devices includes:
identifying an anticipated demand for the content; and
downloading the content to one or more defined locations based on the identified anticipated demand.

9. The method according to claim 8, wherein:
the downloading the content from the core network to the end-user devices includes downloading the content to a multitude of defined locations dispersed throughout the core network.

10. The method according to claim 8, wherein:
the identified anticipated demand is by a community of the end-user devices; and
the downloading the content to a multitude of defined locations includes identifying one or more defined community service locations for serving said community of the end-user devices, and downloading the content to said one or more defined community service locations.

11. The method according to claim 1, wherein:
the network element is in each of one or more of the user end-devices;
the re-writing the embedded content descriptor includes rewriting an object location descriptor to identify a selected location;
the rewriting the request further includes rewriting the request so that the content is downloaded to the first of the end user devices through a selected one of a plurality of modalities; and
the selected location is the closest location given said selected one of the modalities.

12. A system for managing content distribution in a mobile communications environment comprising a core network and a multitude of end-user devices, the system comprising one or more hardware processing units configured for:
downloading content from the core network to the end-user devices;
maintaining a map between the end-user devices, the content downloaded to the end-user devices, and the locations of the end-user devices;
when a first of the end-user devices requests a specified content, using said map and one or more rules to identify a second of the end-user devices having the specified content for downloading the specified content to said first of the end-user devices, including receiving the request at a network element having knowledge of the location of the content, and the network element rewriting the request so that the specified content is downloaded to the first of the end-user devices from the second of the end-user devices, the rewriting including
extracting an embedded content descriptor from the request,
selecting a location of the specified content, including inputting the content descriptor to a content lookup module, and based on output from the content lookup module and a network congestion monitoring module, calculating a content retrieval location, and
rewriting the embedded content descriptor to enable the first of the end-user devices to fetch the specified content from the second of the end-user devices;
returning the re-written embedded content descriptor to the first of the end-user devices; and said first of the end-user devices fetching the specified content from the identified second of the end-user devices; and wherein
the downloading content includes pre-pushing the specified content, before the specified content is requested, to one of a group of locations based on a classification of the specified content; and
the pre-pushing the specified content includes determining when and where to pre-push the specified content, and how long to keep the specified content in storage, by correlating spatio-temporal patterns over multiple users, and correlating the spatio-temporal patterns over multiple servers at different locations of the mobile communications environment.

13. The system according to claim 12, wherein the maintaining a map includes rewriting object location descriptors embedded in the content when the content is downloaded to the end-user devices.

14. The system according to claim 12, wherein the downloading content from the core network to the end-user devices includes:
monitoring the downloading of the content from the core network to the end-user devices; and
using said monitoring to identify patterns of requests for the content by selected ones of the end-user devices.

15. The system according to claim 12, wherein the one or more hardware processing units are further configured for: encrypting the specified content on said second of the end-user devices; and sending to said first of the end-user devices a key for decrypting the encrypted specified content.

16. The system according to claim 12, wherein:
a plurality of communication modes are used to communicate between the end-user devices;
one of the communication modes is selected as a preferred mode; and
the second of the end-user devices is identified by identifying the end-user device that is the closest of the end-user devices to said first of the end-user devices that communicates with the first of the end-user devices through said preferred mode.

17. An article of manufacture comprising:
at least one tangible computer readable hardware medium having computer readable program code logic tangibly embodied therein for managing content distribution in a mobile communications environment comprising a core network and a multitude of end-user devices, said program code logic, when executing in one or more processing units, performing the following:
downloading content from the core network to the end-user devices;
maintaining a map between the end-user devices, the content downloaded to the end-user devices, and the locations of the end-user devices;
when a first of the end-user devices requests a specified content, using said map and one or more given rules to identify a second of the end-user devices having the specified content for downloading the specified content to said first of the end-user devices, including receiving the request at a network element having knowledge of the location of the content, and the network element rewriting the request so that the specified content is downloaded to the first of the end-user devices from the second of the end-user devices, the rewriting including
extracting an embedded content descriptor from the request,
selecting a location of the specified content, including inputting the content descriptor to a content lookup module, and based on output from the content lookup module and a network congestion monitoring module, calculating a content retrieval location, and rewriting the embedded content descriptor to enable the first of the end-user devices to fetch the specified content from the second of the end-user devices; and returning the re-written embedded content descriptor to the first of the end-user devices; and wherein the downloading content includes pre-pushing the specified content, before the specified content is requested, to one of a group of locations based on a classification of the specified content; and the pre-pushing the specified content includes determining when and where to pre-push the specified content, and how long to keep the specified content in storage, by correlating spatio-temporal patterns over multiple users, and correlating the spatio-temporal patterns over multiple servers at different locations of the mobile communications environment.

18. The article of manufacture according to claim 17, wherein the maintaining a map includes rewriting object location descriptors embedded in the content when the content is downloaded to the end-user devices.

19. The article of manufacture according to claim 17, wherein the downloading content from the core network to the end-user devices includes:
   monitoring the downloading of the content from the core network to the end-user devices; and
   using said monitoring to identify patterns of requests for the content by selected ones of the end-user devices.

20. A method of managing content distribution in a mobile, wireless communications environment including a core network and a multitude of end-user devices, the method comprising:
   downloading content from the core network to the end-user devices:
   rewriting object location descriptors embedded in the content when the content is downloaded to the end-user devices;
   when a first of the end-user devices requests a specified content, using one or more rules to identify a second of the end-user devices having the specified content, including receiving the request at a network element having knowledge of the location of the content, and the network element rewriting the request so that the specified content is downloaded to the first of the end-user devices from the second of the end-user devices, the rewriting including
   extracting an embedded content descriptor from the request,
   selecting a location of the specified content, including inputting the content descriptor to a content lookup module, and based on output from the content lookup module and a network congestion monitoring module, calculating a content retrieval location, and rewriting the embedded content descriptor to enable the first of the end-user devices to fetch the specified content from the second of the end-user devices;

returning the re-written embedded content descriptor to the first of the end-user devices; and said first of the end-user devices fetching the specified content from the second of the end-user devices; and wherein the downloading content includes pre-pushing the specified content, before the specified content is requested, to one of a group of locations based on a classification of the specified content; and the pre-pushing the specified content includes determining when and where to pre-push the specified content, and how long to keep the specified content in storage, by correlating spatio-temporal patterns over multiple users, and correlating the spatio-temporal patterns over multiple servers at different locations of the mobile communications environment.

21. The method according to claim 20, wherein the downloading content from the core network to the end-user devices includes:
   monitoring the downloading of the content from the core network to the end-user devices;
   using said monitoring to identify patterns of requests for the content by selected ones of the end-user devices; and
   based on said patterns, downloading identified content items to some of said devices for said selected ones of the end-user device, prior to said selecting ones of the end-users fetching said identified content items.

22. The method according to claim 20, further comprising:
   encrypting the specified content; and
   sending to said first of the end-user devices a key for decrypting the encrypted specified content.

23. The method according to claim 20, wherein:
   a plurality of communication modes are used to communicate between the end-user devices;
   one of the communication modes is selected as a preferred mode; and
   the second of the end-user devices is identified by identifying the end-user device that is the closest of the end-user devices to said first of the end-user devices that communicates with the first of the end-user devices through said preferred mode.

24. The method according to claim 20, wherein the downloading content from the core network to the end-user devices includes:
   identifying an anticipated demand for the content by a defined group of the end-users; and
   downloading the content to one or more defined locations based on the identified anticipated demand before said content is fetched by any of the defined group of the end user devices.

* * * * *